Jan. 3, 1928.

H. H. KISTNER 1,654,737

WORK HOLDER

Filed Nov. 18, 1924

Inventor

Herman H. Kistner.

By Emery, Booth, Janney & Varney his Attorneys

Patented Jan. 3, 1928.

1,654,737

UNITED STATES PATENT OFFICE.

HERMAN H. KISTNER, OF ELIZABETH, NEW JERSEY.

WORK HOLDER.

Application filed November 18, 1924. Serial No. 750,652.

This invention relates to work holders for holding a plurality of pieces of work, such as piston rings, in axial alinement for rotation during the finishing of the outer faces thereof, and aims generally to simplify and improve such devices.

In the accompanying drawings, wherein I have shown for illustrative purposes a preferred embodiment of my invention:

Figure 1:
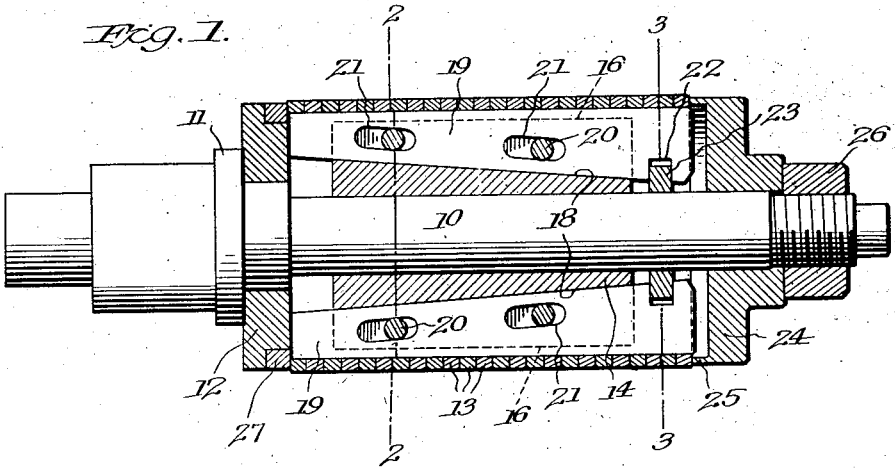
Fig. 1 is a vertical central sectional view of the work holder and rings assembled thereon in position for outside finishing, and supporting stand therefor.
Figure 2:
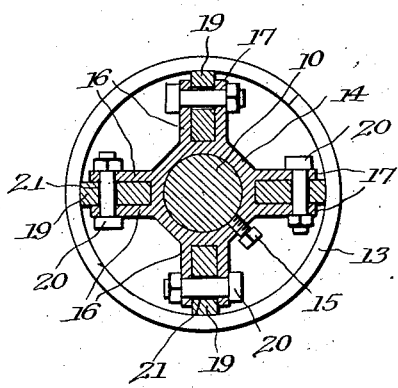
Fig. 2 is a transverse sectional view taken on the line 2—2 of Fig. 1.
Figure 3:
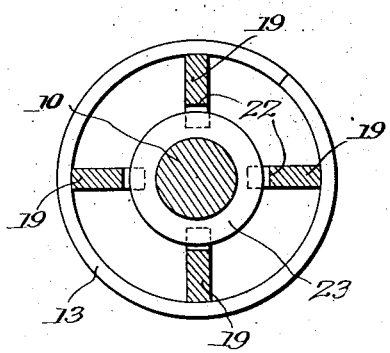
Fig. 3 is a similar view taken on the line 3—3 of Fig. 1.

In the embodiment of my invention selected for illustration in the drawings, which is primarily intended for holding piston rings during the process of turning their outer faces, the working parts of the holder are mounted upon a spindle 10, thereby forming a unitary work holder or mandrel, suitably formed at its opposite ends to operatively engage the head stock chuck and tail stock spindle of a lathe or other suitable machine as is well understood in the art. The spindle 10 (see Fig. 1) is provided at one end with an annular flange 11, against which abuts a head clamping plate 12; and the opposite end of the spindle is threaded for a short distance. The clamping plate 12 is preferably circular in form and is of a diameter slightly greater than the internal diameter of the piston rings 13 when contracted, but less than the external diameter thereof.

My invention contemplates the provision of work centering means adjustable to accommodate piston rings of various diameters, and thickness, and in the embodiment shown I provide a sleeve 14 suitably locked to said spindle 10, as by a set screw 15. The sleeve 14 is formed with a plurality of radially extending guides 16, there being four guides shown in the drawings although three or more would serve the purposes equally well. Each of the guides is bifurcated to provide spaced walls 17, and the bottoms of the guides are inclined toward one end forming sloping seats 18. Wedge shaped centering ribs 19 are positioned in these guides between the walls 17, and are so formed that their outer edges preferably are parallel to the axis of the spindle; but the edge adjacent the inclined bottoms 18 of the guide is inclined correspondingly.

The ribs 19 may be locked in adjusted position in the guides 16 by any suitable means, and in the form shown, the guide walls 17 are apertured to receive bolts 20 passing through elongated openings 21 in the ribs 19 and extending parallel to the inclined inner edge thereof. The ribs 19 are provided with notches 22 near one end thereof to receive a single ring 23 snugly fitting but slidable upon the spindle 10, in order that the ribs may be simultaneously and uniformly adjusted to desired diameter.

A clamping plate 24 is positioned on the spindle 10 adjacent to the threaded end 11, and this plate is preferably formed with a horizontal rim 25 of less thickness than the piston rings. The plate 24 is clamped against the assembled rings by suitable means such as a nut 26 on the threaded end of the spindle 10.

In assembling the piston rings upon the mandrel a plurality of piston rings, that have previously been contracted to their normal contracted shape by suitable means such as a light resilient band, are then placed upon the mandrel, as shown in Fig. 1, one end ring resting against a removable contact ring 27 carried by the clamping plate 12. This removable ring 27 may be replaced by similar rings of suitable sizes to suit other sizes of piston rings, as is well understood in the art.

The piston rings are centered on the mandrel with respect to the axis of the spindle by means of the adjustable ribs 19 which are secured in position by the bolts 20. After adjusting the ribs to center the rings on the mandrel, the clamping plate 24 is positioned over the other end of the spindle 10 with the rim 25 contacting with the end ring, and the nut 26 is then tightened on the threaded end 11 of the spindle to clamp the piston rings on the mandrel by side pressure. The ring contracting means are then removed from the rings, and the mandrel and assembled rings are ready to be placed in a lathe or other suitable machine for finishing the exterior of the rings to a true cylindrical surface, as by cutting or grinding.

Working holders embodying my invention are especially well adapted for use in holding piston rings to be finished exteriorly prior to finishing interiorly in a sleeve type holder, because of the ease with which the rings may be transferred from the mandrel into the sleeve, the collapsible ribs enabling the mandrel to be removed after the rings are clamped in the sleeve holder with a minimum amount of expansion of the rings. This is particularly advantageous in making piston rings from distorted patterns.

Obviously my invention is not confined to the exact details of construction shown and described.

What I claim is:

1. A work holder for clamping a plurality of piston rings in contracted position during the machining of the outer faces thereof comprising a spindle, longitudinally ribbed radially expandable ring centering means secured to said spindle and adapted to engage the inner faces of the rings to position them centrally of said spindle, and means for clamping said rings by pressure exerted from opposed sides thereof to hold them contracted in their centered position while maintaining their entire outer faces unobstructed ready for machining tool.

2. A work holder for piston rings, comprising a spindle, means thereon for centering the rings around the spindle including a sleeve having a plurality of radially extending guideways and movable centering plates adapted to be adjustably locked therein, and means engaging only the ends of the assembled rings for clamping said rings around said centering means by pressure exerted from opposed sides thereof, whereby to maintain their outer faces unobstructed ready for the machining tool.

3. A work holder for piston rings comprising a spindle, means for centering the rings around the spindle and means for exerting a pressure on opposed sides of said rings surrounding the centering means to clamp them in centered position, said centering means including a sleeve locked to said spindle and having a plurality of radially extending guideways, the bottom of said guideways being inclined toward one end thereof, ring engaging means adapted to be adjustably locked in said guideways, and means connecting all of said ring engaging means.

4. A work holder for piston rings comprising a spindle having guides longitudinally arranged thereon, the bottoms of said guides being inclined outwards, and the side walls of each of said guides being parallel to each other, centering strips in said guides, and means for maintaining said strips therein, and means arranged on said spindle and engaging said strips for moving them lengthwise simultaneously, said strip engaging means being freely movable axially on said spindle, and means for clamping said piston rings by pressure exerted from opposed sides thereof without clamping said strips.

5. A work holder for piston rings or the like comprising a spindle, a clamping plate on said spindle, a sleeve locked on said spindle and formed with a plurality of radially extending guideways, ribs adjustably locked in said guideways, means connecting all of said ribs for simultaneous adjustment, and means for clamping a plurality of rings on said work holder by pressure exerted from opposed sides thereof.

6. A work holder of the kind described, comprising a spindle 10, a clamping plate 12 thereon, a sleeve 14 on said spindle and locked against movement thereon by locking means 15, a plurality of radially extending guideways 16 having spaced walls 17 and an inclined bottom 18, wedge shaped ribs 19 mounted between the walls 17 and resting upon the bottom 18, means 23 connecting all of said ribs, a clamping plate 24, and a nut 26 threaded on the spindle whereby a plurality of articles may be clamped between the plates 12 and 24 by side pressure and centralized on said work holder by means of the ribs 19.

In testimony whereof, I have signed my name to this specification.

HERMAN H. KISTNER.